United States Patent [19]
Hall, III et al.

[11] Patent Number: 5,579,320
[45] Date of Patent: Nov. 26, 1996

[54] CHANNEL UNIT TRANSMISSION FOR REMOVING FALSE DATA BITS IN ADJACENT UNTERMINATED CHANNEL SLOTS FOR D4 AND SLC-96 CHANNEL BANKS

[75] Inventors: Clifford L. Hall, III, Huntsville; Scott C. Bailey, Harvest, both of Ala.

[73] Assignee: Adtran, Inc., Huntsville, Ala.

[21] Appl. No.: 369,187

[22] Filed: Jan. 5, 1995

[51] Int. Cl.⁶ .................................. H04J 3/16
[52] U.S. Cl. ................................. 370/95.1
[58] Field of Search ............... 370/85.7, 85.1, 370/101, 100.1, 110.1, 95.1, 95.2, 95.3, 94.1, 60, 85.08, 77, 50, 11, 12, 9, 10, 6, 84; 340/825.08; 375/237, 238, 239, 242, 312, 45; 455/68, 69, 116; 379/92, 93, 94, 95, 96

[56] References Cited

U.S. PATENT DOCUMENTS

5,111,485  5/1992  Serack ..................... 370/101

Primary Examiner—Douglas W. Olms
Assistant Examiner—Dang Ton
Attorney, Agent, or Firm—Charles E. Wands

[57] ABSTRACT

A bleedover prevention circuit prevents a low data value of the last bit of an occupied channel unit time slot from bleeding over into the first and second bit times of an unoccupied channel unit time slot of a channel bank, by forcing the data lead to a high logic level within a terminal portion of the last bit time of an occupied channel unit time slot. The terminal portion of the last bit time occurs within a time interval delayed relative to a sampling clock edge, so that it does not detrimentally impact the validity of the value of the last data bit. If the immediately succeeding channel time slot is unoccupied, driving the data lead high prior to the beginning of such unoccupied channel time slot will render immaterial whether the last data bit value of the occupied channel time slot is a 'one' or a 'zero', and will serve to effectively overcome the relatively long charging time, that would otherwise be required to pull the data lead high if the last data bit value were a 'zero'.

24 Claims, 7 Drawing Sheets

CHANNEL UNIT TRANSMISSION FOR REMOVING FALSE DATA BITS IN ADJACENT UNTERMINATED CHANNEL SLOTS FOR D4 AND SLC-96 CHANNEL BANKS

FIELD OF THE INVENTION

The present invention relates in general to telephone communication systems, and is particularly directed to a mechanism for removing false data bits in adjacent unterminated channel slots, by preventing potential bleedover of a logical '0' data bit in the last bit time of an occupied channel unit time slot onto the data bus of a D4 channel bank unit, during one or more bit times of an immediately succeeding unoccupied channel unit time slot, by forcing the D4 channel unit's data bus to a prescribed logical '1' representative voltage during a terminal portion of the last bit time of the occupied channel unit time slot, irrespective of the data value during that last bit time.

BACKGROUND OF THE INVENTION

Even though digital communications equipment has met with widespread acceptance in a variety of technologies, telephone companies have been slow to integrate digital signalling subsystems and communication schemes into their well established copper wire networks. One of the principal reasons for such hesitation is the fact that a significant part, if not all, of an established telephone network employs traditional analog signalling equipment. Still, because of ever increasing user demand, regional Bell operating companies (RBOC's) currently provide leased-line digital services to sophisticated customers, typically by means of a digital (D4) channel bank diagrammatically illustrated at 10 in FIG. 1, through which digital services are provided by the network to digital signalling equipment located at a customer's premises 20.

Figure 1:
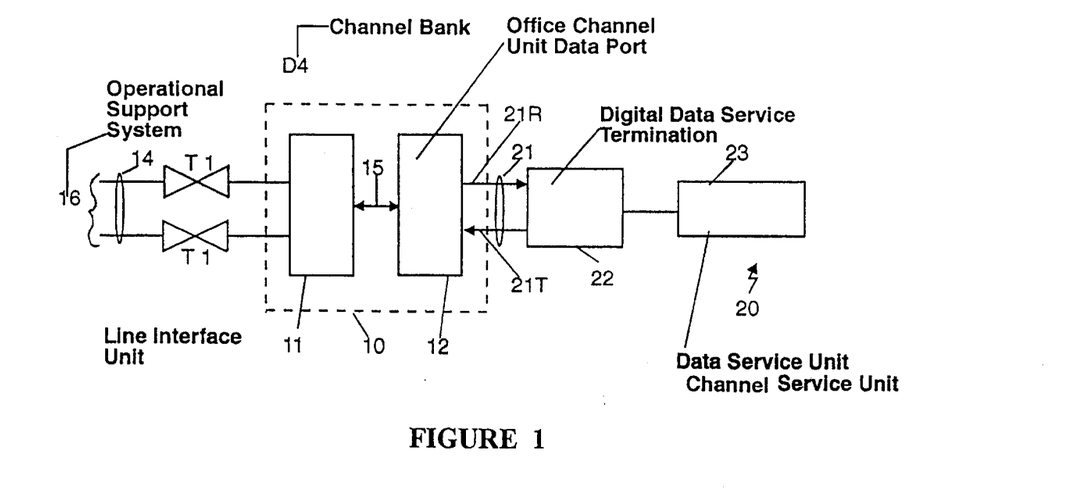
FIG. 1 diagrammatically illustrates the interface of a digital (D4) channel bank with a digital telephone service network and digital signalling equipment at a customer site.

D4 channel bank 10 typically contains a line interface unit (LIU) 11 which interfaces T1 (1.544 Mb/s) carrier traffic at one end of a T1 digital communications link 14. A second end of T1 link 14 may be connected to another office containing an operational support system (OSS) 16 located remotely with respect to terminal 10. D4 channel bank 10 also includes an office channel unit data port (OCU-DP) 12, which is coupled to LIU 11 via an intra bank PCM communications link 15, and interfaces bipolar signals carried by a local loop (e.g. a four-wire metallic link) 21 to (via receive link portion 21R) and from (via transmit link portion 21T) a digital data service termination (DDST) 22 which may be used to terminate the metallic loop 21, together with a data service unit/channel service unit (CSU/DSU) 23 located at the customer's premises 20.

The LIU 11 and OCU-DP 12 of D4 channel bank 10 have respective transmit/receive buffers associated with the respective ports of that unit. These buffers are controlled by a resident microcontroller for interfacing DS1-formatted data traffic from the line (T1 link 14) side of the channel bank, retiming the traffic as a bipolar data stream for transmission as a data stream from the D4 channel bank 10 to the customer's DSU/CSU site 20, and reconverting bipolar signals, supplied from the customer site 20 to OCU data port 12, into DS1 data frames for transmission over T1 link 14.

Figure 2:
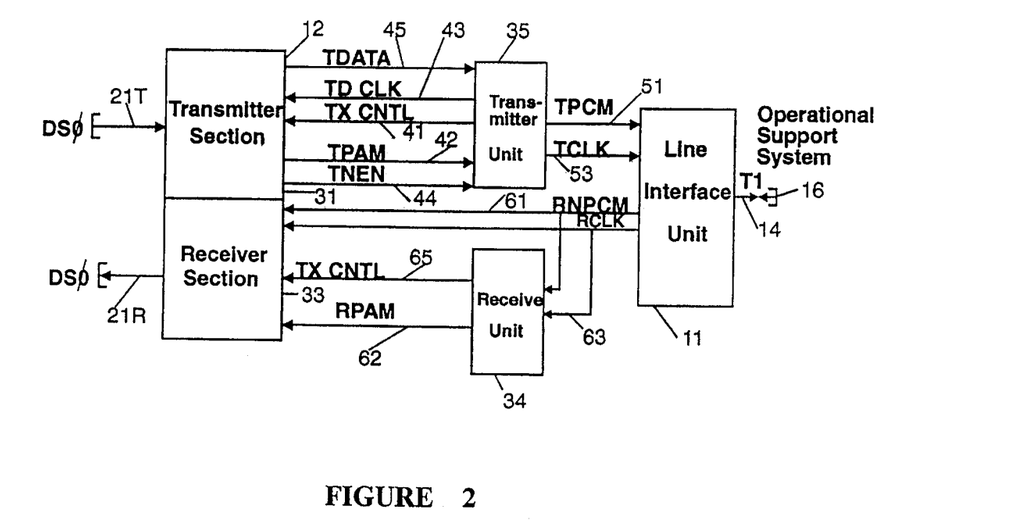
FIG. 2 diagrammatically illustrates a D4 channel bank.

As shown in FIG. 2, an OCU-DP 12 contains a transmitter section 31, to which DS0 data from the four wire metallic loop 21 is supplied from the customer site termination equipment, and a receiver section 33, from which DS0 data is coupled to four wire metallic loop 21 for delivery to the customer site termination equipment. D4 channel bank 10 also includes a receive unit 34 and transmit unit 35. Transmit unit 35 (shown in greater detail in FIG. 5, to be described) supplies transmission control TX-CNTL signals via a transmission control link 41 in the form of a set of transmit sequence control leads (TWD, TSP, TSQ) for controlling the format of the transmissions, and a transmit data clock TDCLK, via a transmit data clock link 43, to transmitter section 31 of each OCU-DP 12. In response to these signals, the OCU-DP 12 decodes its respective channel select strobe and transmits data onto a transmit data (TDATA) bus lead in a respective preassigned one of a plurality (e.g. 24) of time division multiplexed channel unit time slots of a multi-channel (e.g. 24 channel) unit digroup within the D4 channel bank 10.

According to AT&T defined communication standards, the channel select strobe occurs at an 8 KHz rate and the transmission of eight bits per strobe corresponds to one 64 Kb/s (DS0) channel for a DS1 line. Transmit unit 35 collects the 192 bits (8 bits from each of the (24) channel units) from transmission data bus 45, appends a framing bit, and outputs the resulting DS1-formatted PCM data stream onto TPCM link 51, and an associated transmit clock signal via TCLK link 53 to line interface unit 11. An additional TPAM link 42 is provided so as to accommodate the insertion of one or more analog channel unit's data on the TPCM link 51.

Specifically, where the channel unit is an analog unit, rather than a digital unit, TPAMlink 42 provides for the transmission of pulse amplitude modulated (PAM) samples of analog signals to transmit unit 35 for subsequent conversion to PCM data bytes and insertion into the appropriate channel unit time slot of TPCM link 51. In addition, a transmission multiplexer control link TNEN 44 is coupled to transmit unit 35. When an analog channel unit is plugged into the backplane it asserts ground on link 44, during its respective timeslot, so as to inform the transmit unit 35 that the channel unit is an analog channel unit. During the transmission time slot assigned for that (analog) channel the assertion of ground on TNEN link 44 causes the state of the transmit unit's data transmission multiplexer to be switched to the output of an analog-to-digital encoder, through which analog data is digitally encoded for insertion into the time slot associated with that analog channel unit.

'A' and 'B' signalling bits are also coupled to transmit unit 35 from an analog channel unit for insertion into the LSB position of the data byte of frame six ('A' bit), and frame twelve ('B' bit) of the superframe. The line interface unit 11 may convert the superframe framing format provided by transmit unit 35 to DS1 extended superframe format. The line interface unit 11 then couples the formatted DS1 data onto the digital carrier for transmission over T1 link 14. Incoming T1 carrier signals from T1 link 14 are received by line interface unit 11, and extended superframe format is converted into superframe formatted signals, as necessary. Payload or signalling bits are not altered. The DS1 data is output to a receive PCM link 61 and coupled to receive unit 34 and receiver section 33 of OCU-DP 12. The DS1 clock is recovered by LIU 11 and the recovered clock RCLK is coupled over receive clock RCLK link 63 to each of receive unit 34 and receiver section 33 of OCU-DP 12. For an analog channel unit, an RPAM link 62 is coupled from receive unit 34 to the receive section 33 of channel unit 12.

Figure 3:
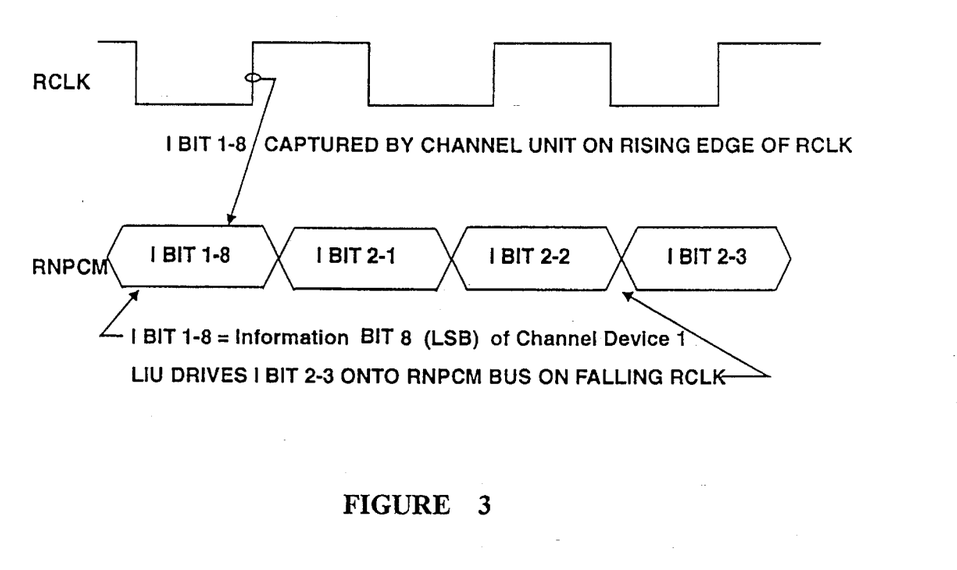
FIG. 3 is a timing diagram illustrating strobe timing containing sequential information bits asserted onto a receive data link coincident with falling edges of sequential receive data sampling clock signals.

Receive unit 34 synchronizes its timing with the DS1 framing pattern of the received signal and supplies channel unit control signals over link 65 to receiver section 33, so as to allow each OCU-DP to decode its channel select strobe for the received data and to extract its corresponding byte of data from the associated time slot of data link 61. This data strobe timing is illustrated diagrammatically in FIG. 3, which shows sequential information (I) bits (eight bits per channel i) being asserted onto receive data RNPCM link 61 coincident with falling edges of sequential RCLK signals, thereby allowing for a one-half bit time of set-up and one-half bit time of hold. In the receive direction, there is an additional analog signalling link 62, which is provided to allow analog channel units to deliver PAM samples of analog signals (converted from PCM bytes) to be coupled from receive unit 34 to the appropriate analog channel unit. Control link 65 contains a set of sequence control leads that are employed to control receive signalling format, including the contents of frames six and twelve of a superframe. The receiver section 33 of the channel unit recovers the appropriate 'A' or 'B' signalling bit during the appropriate frame when the channel select strobe is active.

Figure 4:
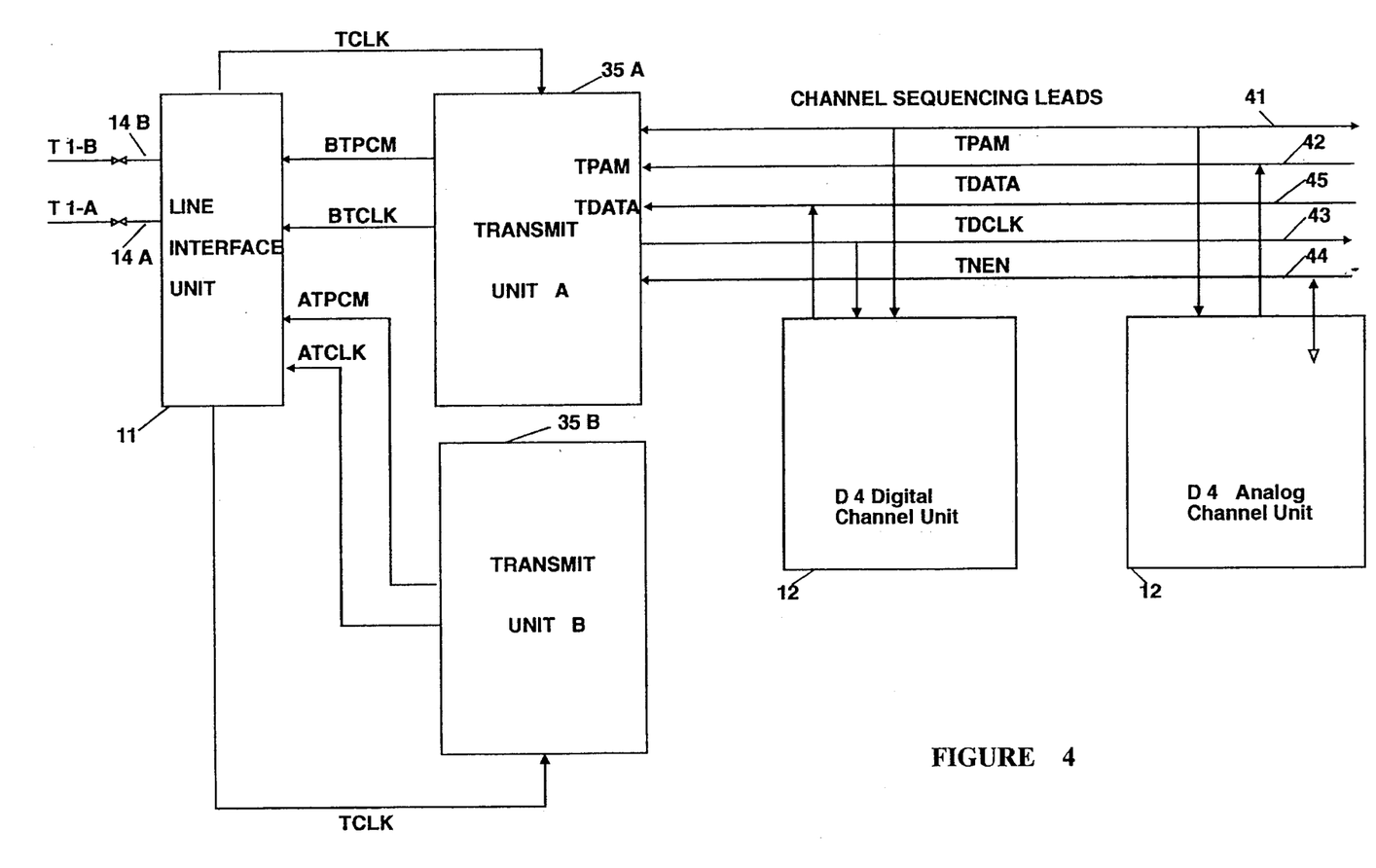
FIG. 4 is a block diagram of the transmit portion of a D4 channel bank, showing plural channel units sharing the transmit data links.

In the D4 channel bank, all OCU-DPs (channel units) 12 share the transmit and receive data links 45 and 61, as diagrammatically illustrated in FIG. 4, so that each channel unit has physical access to every DS0 time slot in a digroup (two twenty-four channel unit digroups A and B being shown in FIG. 4). However, time slot allotment is time division multiplexed under control of control and clock signals supplied by the transmit unit 35 for the transmit direction and by the receive unit 34 for the receive direction.

Figure 5:
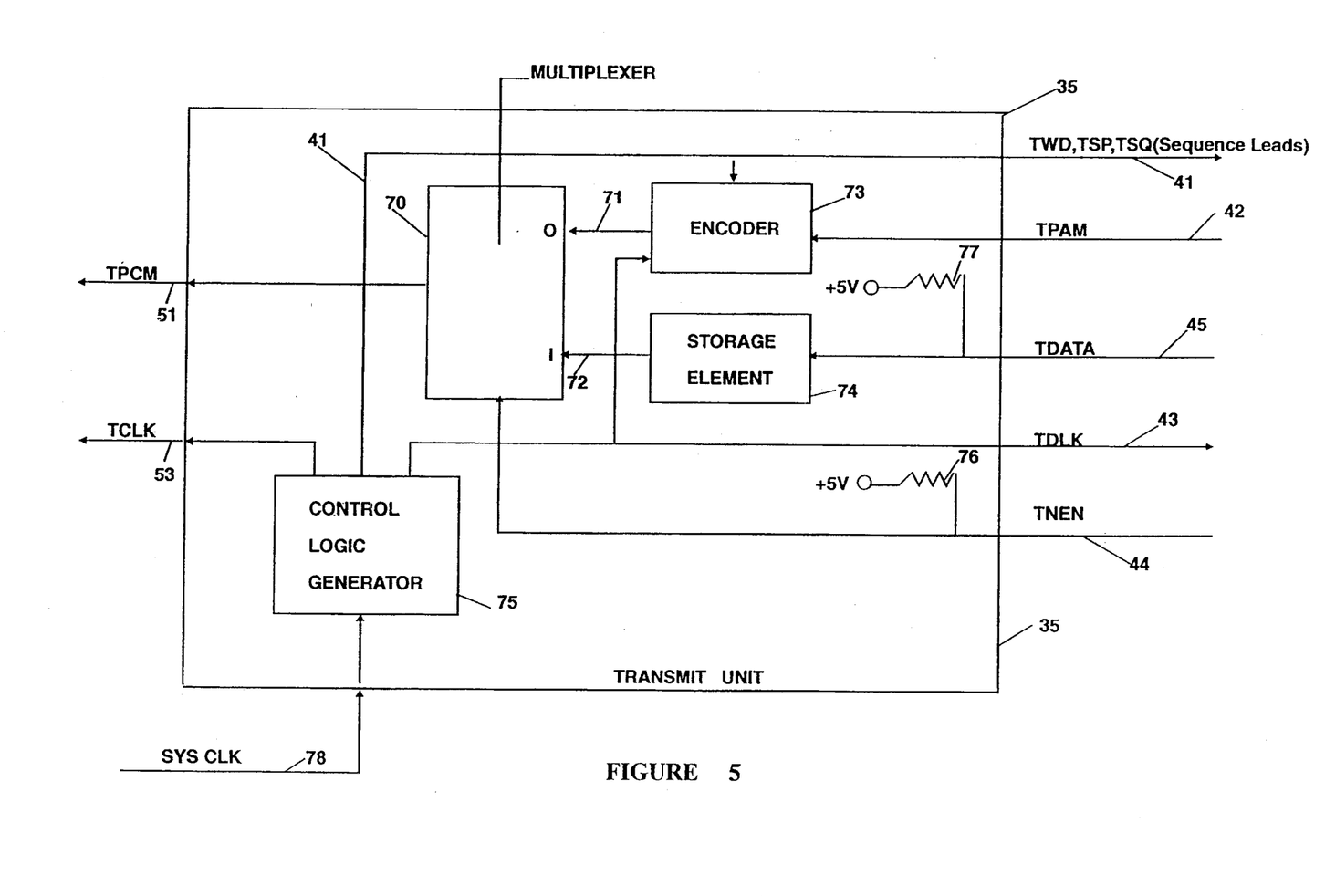
FIG. 5 is a block diagram of the configuration of transmit unit 35 of a D4 channel bank.

Referring now to FIG. 5, the configuration of transmit unit 35 is diagrammatically illustrated as comprising a multiplexer 70, a first input 71 of which is coupled to an analog-digital data encoder 73, and a second input 72 of which is coupled to a digital data storage element 74. Analog-digital data encoder 73 has its input coupled to receive analog data asserted on the analog TPAM lead 42, and is operative to digitize an analog signal level asserted by an analog channel unit on TPAM lead 42 into a digital data word for transmission over TPCM link 51 to LIU 11 under the control of transmission sequence signals TWD, TSQ, TSP generated by a control logic generator 75 on link 41. Control logic generator 75 is coupled to receive a system clock signal on clock input lead 78, and additionally generates both the data sampling clock TDCLK on lead 43 and the transmit clock TCLK on lead 53. The data sampling clock TDCLK on lead 43 is coupled to both encoder 73 and storage element 74. The transmission multiplexer control link TNEN 44 is coupled to the select input of multiplexer 70.

As described above, when an analog channel unit is plugged into the backplane it asserts ground on TNEN link 44, during its timeslot, so as to inform the transmit unit 35, specifically multiplexer 70, that the channel unit is an analog channel unit. If the channel unit is a digital channel unit or no channel unit is plugged into a respective backplane slot, then the TNEN lead 44 is held high (+5V) by a pull-up resistor 76. During the transmission time slot assigned for that (analog) channel unit, the analog channel unit asserts ground on the TNEN link 44, which causes the state of the transmit unit's data transmission multiplexer 70 to be switched to the output of encoder 73, through which analog data is digitally encoded for insertion into the time slot associated with that analog channel unit. On the other hand, as noted above, if the channel unit is not an analog channel unit, ground is not asserted on the TNEN lead 44, so that multiplexer 70 couples storage element 74 to the TPCM lead 51.

Figure 6:
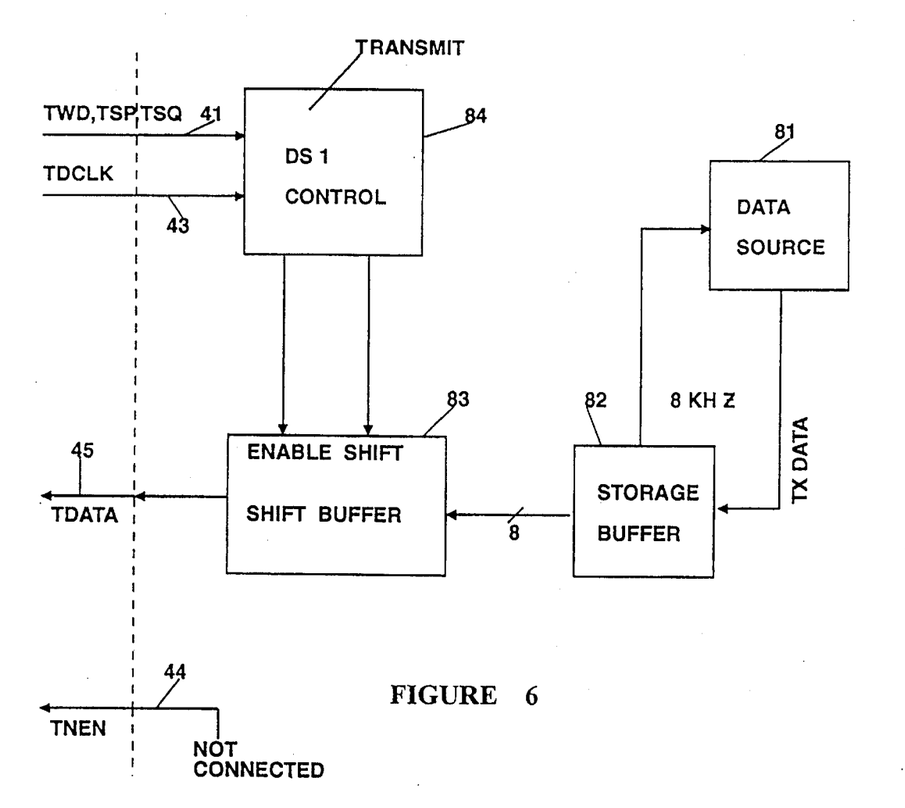
FIG. 6 is a block diagram of a digital channel unit.
Figure 7:
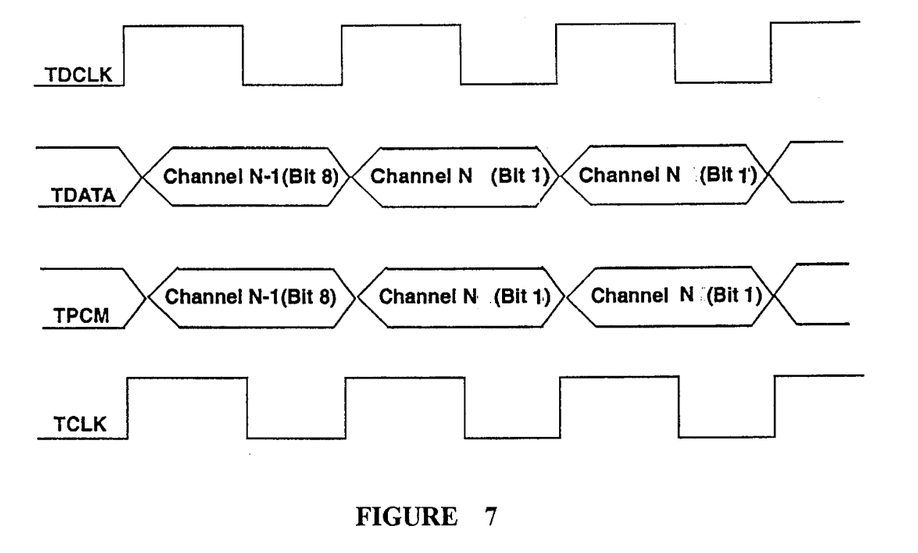
FIG. 7 is a timing diagram showing relationships between TDATA and TDCLK signals, and between TPCM and TCLK signals.

Similar to the TNEN lead 44, the TDATA lead 45 is coupled to a pull-up resistor 77 for pulling the TDATA lead high (+5V), in the absence of the assertion of a low data value on the TDATA lead 45 by a digital channel unit, a block diagram of which is shown in FIG. 6. Within the digital channel unit, TXDATA data to be transmitted, sourced from a data source 81, is clocked into a storage buffer 82 by the 8 KHz channel select strobe. Each byte of data is then loaded into and shifted out of a shift buffer 83 under the control of a DS1TX control signal generator 84, in accordance with the transmission sequence signals TWD, TSQ, TSP supplied by control logic generator 75 on link 41, and TDCLK signals on line 43. In the transmit unit 35, shown in FIG. 5, the successive data bit representative voltage levels asserted by a digital channel unit on the TDATA link 45 are sampled and stored in storage element 74, on the negative-going clock edge of the TDCLK signal on line 43. The data is then clocked out on TPCM link 51 to the LIU 11 together with a clock signal on TCLK lead 53. FIG. 7 is a timing diagram showing relationships between TDATA and TDCLK signals, and between TPCM and TCLK signals.

Where an available backplane channel unit slot is unoccupied, namely, no channel unit (either analog or digital) is plugged into that slot, the TDATA lead 45 is held high at +5V (or continuously at a logical '1') by pull-up resistor 77. This continuously asserted high on the TDATA lead 45 is repeatedly sampled by the falling edge of the TDCLK lead 43 input to storage element 74 as a data value of '1', during the unoccupied channel unit's time slot, so that a continuous sequence of '1's may be transmitted over TPCM link 51 during the unoccupied time slot, thereby maintaining a high '1's density and preventing the generation of a false yellow alarm code.

Because the value of pull-up resistor 77 is low (e.g. on the order of 100–400 Kohms) and is typically part of an input gate of a CMOS or TTL chip, the effective charging time of TDATA lead 45, governed by the time constant product of the pull-up resistor 77 and the inherent capacitance of the TDATA lead 45, is longer (e.g. on the order of one microsecond) than several bit times of a TDATA byte. As a consequence, where there is an unoccupied channel unit time slot immediately following the transmission time slot of an occupied channel unit, there is the potential for the zero bit value of the last data bit of the occupied channel time slot 'bleeding over' into and thereby corrupting an initial one or two bit portion of the above-described all '1's sequence to be transmitted during the unoccupied channel time slot.

More particularly, as explained above, an unoccupied channel unit time slot should cause the state of the TDATA lead 45 to be held continuously unmodulated at the high (pulled-up +5 v) value for the duration of the unoccupied channel's time slot. However, if the last bit of the occupied channel time slot is low (e.g. 0 volts), the relatively long charging time required to pull the TDATA lead 45 up to +5V will extend into or overlap with the first and possibly second bit times of the unoccupied time slot. As a result, during such bit times, the voltage level on TDATA lead 45 may not yet have reached the threshold value corresponding to a logical '1'. In this case, up to the first two bits of the intended data string of all '1's that would otherwise be forwarded over the TPCM lead 51 to the LIU 11 will be sampled as logical '0's rather than logical '1's, thereby corrupting the all '1's sequence of the unoccupied channel time slot. Such a condition causes problems in downstream multijunction circuits, since in a multijunction circuit topology, multiple branches are logically ANDed, so that the occurrence of one or more zero's in place of '1's in the data stream will create errors in the multi junction unit control link.

SUMMARY OF THE INVENTION

In accordance with the present invention, this problem is effectively obviated by forcing the state of the TDATA lead to a logical 'one' (high level or +5V) within a terminal portion of the last bit time of a respective occupied channel unit time slot, irrespective of the data value of that bit time. The terminal portion of the last bit time is defined so as to occur within a time interval that is subsequent to the time of occurrence of the clock edge of the TDCLK clock through which the last bit's data value is sampled. (As a non-limitative example, where the TDCLK sampling clock edge occurs mid-bit, such a time interval may correspond to the last one-quarter of the bit time.) In other words, the present invention is operative to take advantage of that portion of the last bit time following the TDCLK's sampling edge, to drive the TDATA lead to a logical 'one' level, without detrimentally affecting the validity of the value of the last data bit. If the immediately succeeding channel time slot is unoccupied, driving the TDATA lead high prior to the beginning of such unoccupied channel time slot will render immaterial whether the last data bit value of the occupied channel time slot is a 'one' or a 'zero' and will serve to effectively overcome the relatively long charging time that would otherwise be required to pull the TDATA lead up to +5V, if the last data bit value were a 'zero'.

DETAILED DESCRIPTION

Before describing in detail the (bleedover prevention) mechanism for removing false data bits in adjacent unterminated channel slots in accordance with the present invention, it should be observed that the present invention resides primarily in a novel structural combination of conventional signal processing and communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the figures do not necessarily represent the mechanical structural arrangement of the exemplary system, but are primarily intended to illustrate the major structural components of the system in a convenient functional grouping, whereby the present invention may be more readily understood.

Figure 8:
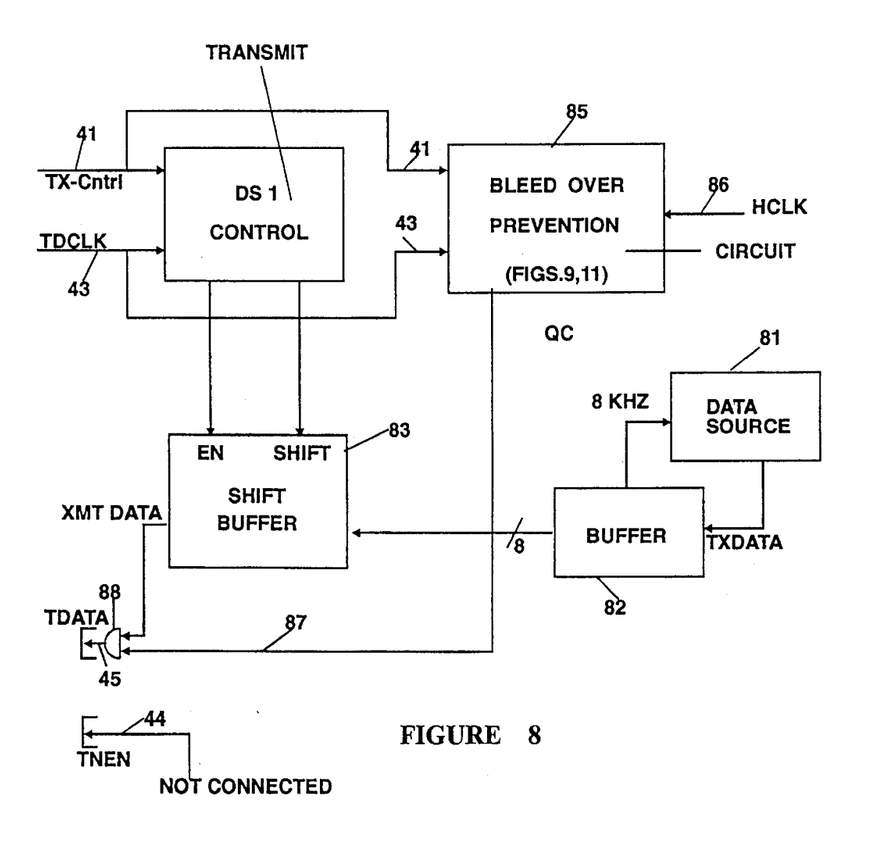
FIG. 8 is a block diagram of a digital channel unit that incorporates a bleedover prevention circuit of the present invention.
Figure 9:
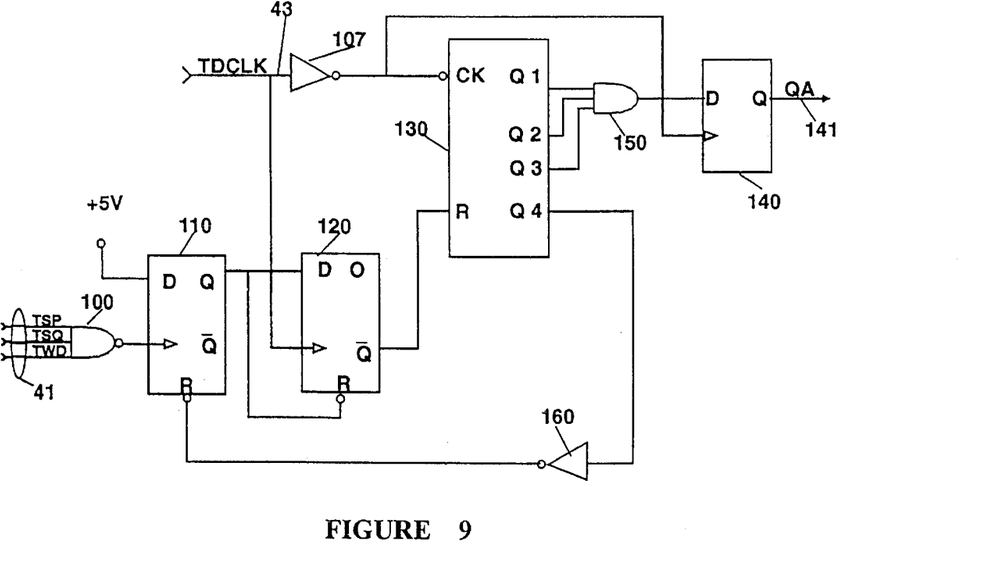
FIG. 9 is a logic circuit diagram of a portion of the bleedover prevention circuit 85 of FIG. 8.
Figure 11:
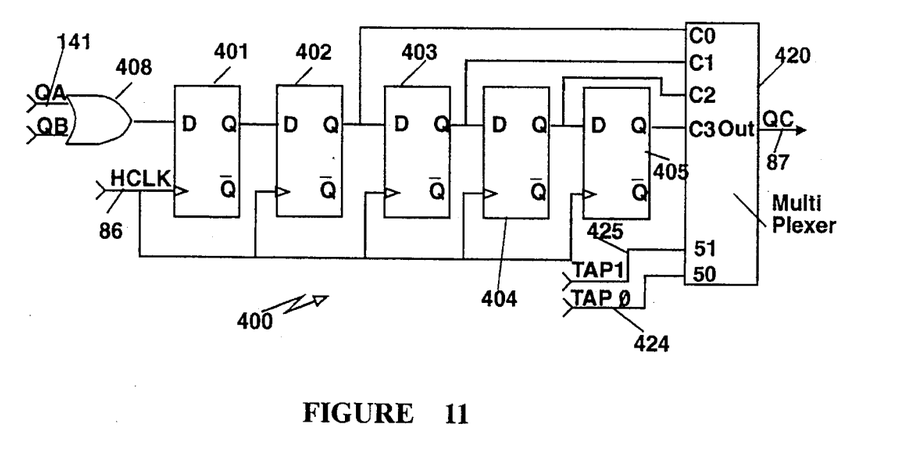
FIG. 11 is a logic circuit diagram of a second portion of the bleedover prevention circuit 85 of FIG. 8.

FIG. 8 diagrammatically illustrates the manner in which the digital channel unit of FIG. 6 is modified in accordance with an embodiment of the present invention to incorporate a bleedover prevention circuit 85 (shown in detail in FIGS. 9 and 11 to be described). Bleedover prevention circuit 85 is coupled to receive the transmission sequence signals TWD, TSQ, TSP supplied by control logic generator 75 on link 41, TDCLK signals on line 43, and also a high speed clock HCLK on lead 86. The output of bleedover prevention circuit 85 on line 87 is a positive pulse signal QC which is delayed with respect to the negative-going edge of TDCLK and is logically ORed in OR gate 88 with the transmit data bit logic level output from shift buffer 83 for application to TDATA lead 45, as will be described.

Referring now to FIG. 9, a logic circuit diagram of a first portion of bleedover prevention circuit 85 for forcing the TDATA lead to a logical 'one' during the terminal portion of the last data bit time of an occupied channel slot is shown as comprising a NAND gate 100 respective inputs 101, 102, 103 of which are coupled to channel sequencing leads TSP, TSQ and TWD of TXCNTL control link 41, and the output of which 104 is coupled to the clock input of a flip-flop 110. The D input of flip-flop 110 is hard-wired to a logical '1' (+5V) input, while its Q output is coupled to the D input and inverted reset input of flip-flop 120. The clock input of flip-flop 120 is coupled to TDCLK lead 43, which is applied to inverter 107. The QBAR output of flip-flop 120 is coupled to the reset input of a counter 130, an inverted clock input of which is coupled to the output of inverter 107, which is also coupled to the clock input of flip-flop 140. Counter 130 has plural outputs Q1–Q3 coupled to respective inputs of AND gate 150, the output of which is coupled to the D input of flip-flop 140. The Q4 output of counter 130 is fed back through inverter 160 to the inverted reset input of flip-flop 110. The Q output of flip-flop 140 is coupled as output signal QA over output line 141.

Figure 10:
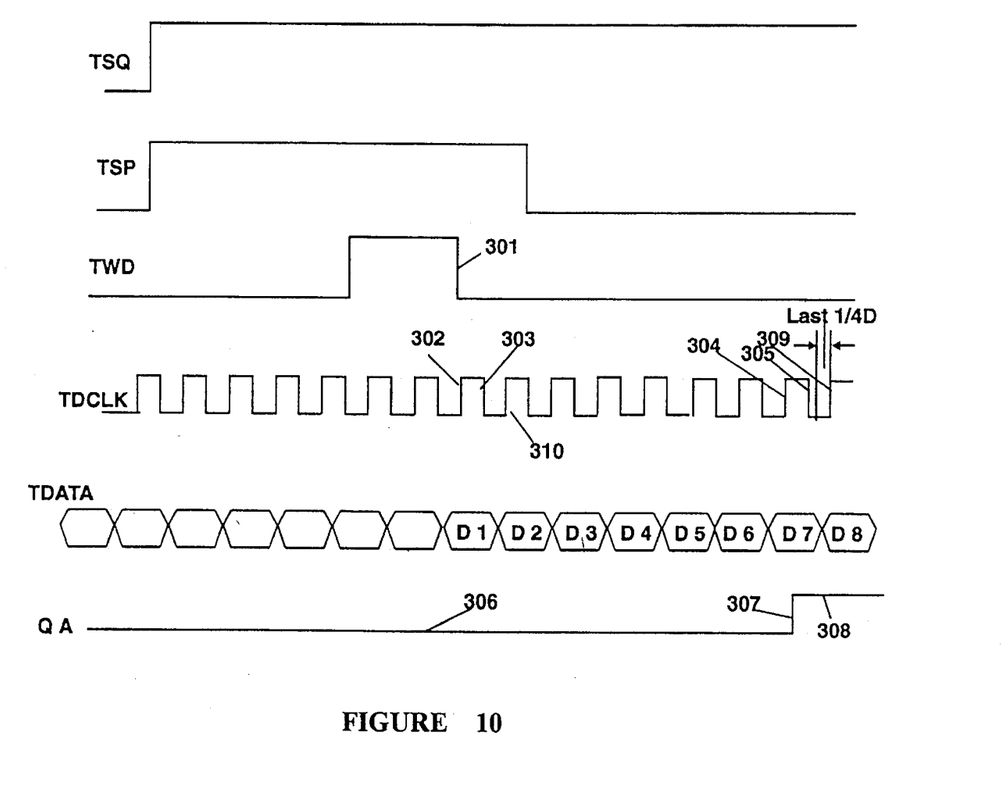
FIG. 10 is timing diagram associated with the operation of the logic circuit of FIG. 9.

The operation of the logic circuit of FIG. 9 may be understood with reference to the timing diagram of FIG. 10, which shows the timing signals on the backplane of a D4 channel unit, including TSQ, TSP, TWD and TDCLK, the TDATA signal and the QA output of flip-flop 140 on line 141. The TSQ and TSP signals are continuously high for the duration of the channel time slot, while the TWD signal transitions from high to low during the first bit of the last data byte of the time slot. As noted above, the voltage level on TDATA lead 45 is sampled on the falling edge of the TDCLK, which occurs essentially at the midpoint of a data bit.

With the TSQ, TSP and TWD signals being applied as inputs to NAND gate 100, its output is low during the high level of each of these signals, and terminates its low state immediately prior to the first bit of the channel timeslot for the unit. Upon the TWD signal transitioning from high to low as shown at edge 301, the output of NAND gate 100 goes high, clocking a hard-wired '1' (+5V) into flip-flop 110, causing its Q output to go high at the D input to flip-flop 120. The next low-to-high transition 302 of TDCLK clocks a '1' into flip-flip 120. One half of a TDCLK cycle later, the high-to-low transition 303 of the TDCLK clock signal, which is inverted to a low-to-high transition by inverter 107, clocks output flip-flop 140. Since the D input to output flip-flip 140 is derived from AND gate 150, all of the inputs of which are initially zero, a zero is clocked into output flip-flop 140 at this time, so that its output QA on line 141 is low, as shown by low voltage level 306.

During positive-going edges of succeeding TDCLK signals, beginning with edge 310, counter 130 is sequentially incremented. Upon the count value of counter 130 reaching seven, corresponding to edge 304 of the TDCLK clock signal that is coincident with the transition from TDATA bit D7 to TDATA bit D8, each of the inputs to AND gate 150 will be a '1', so that its output, and therefore the D input to output flip-flop 140, will also be a '1'. At the next falling edge 305 of the TDCLK signal, which occurs midway of the last data bit D8, the output of inverter 107 transitions from low to high, thereby clocking the '1' output of AND gate 150 into flip-flop 140, causing its QA output on line 141 to transition from low to high, as shown by positive-going edge 307 to a high voltage level 308. At the next positive clock edge of TDCLK, counter 130 is incremented from a value of seven (0111) to a value of eight (1000), so that its Q4 output goes high, which causes flip-flops 110 and 120 and counter 130 to be reset in preparation for a new cycle during the next occupied channel unit's time slot. Thus, the logic circuit of FIG. 9 is operative to provide a positive edge transition 307 at the midpoint of the last bit D8 of an occupied channel unit time slot, coincident with the negative edge 305 of the data-sampling TDCLK.

A logic circuit diagram of a second portion of the bleedover prevention circuit 85 of FIG. 8 is shown in FIG. 11 as comprising a controlled delay clock edge generator 400, which is coupled to receive the QA output signal on line 141 from flip-flop 140 of the logic circuit of FIG. 9. QA signal line 141 is shown as being coupled to one input of an OR gate 408, illustrated in broken lines, the output of which is coupled to a plurality of cascaded flip-flops 401–405. A second input of OR gate 408 is coupled to receive an input signal QB, which is generated by a circuit substantially the same as that of FIG. 9, except that it is operative to provide a positive edge transition at the midpoint of the last bit D8 of a parity byte that is transmitted in a separate timeslot on the TDATA bus. The use of OR gate 408 allows controlled delay clock edge generator 400 to be used to for both QA and QB signals.

The Q outputs of cascaded flip-flops 402–405 are coupled as respective inputs to multiplexer 420, the QC output of which is coupled to bleedover prevention circuit output line 87 to one input of OR gate 88 in FIG. 8. Cascaded flip-flops 401–405 are clocked by the high speed clock signal HCLK on line 86, the frequency of which is considerably higher than that of TDCLK, so that controlled delay clock edge generator may generate a clock edge that occurs at a controllably selected sub-portion of a TDCLK cycle. Which sub-portion of a TDCLK cycle is selected is governed by the states of select inputs 424 and 425 of multiplexer 420. Providing a multi-stage arrangement as shown in FIG. 11 accommodates both a variable delay and different high speed clock frequencies.

The operation of the controlled delay clock edge generator circuit 400 of FIG. 11 is straightforward. The logic level of the input signal of interest (e.g. QA in the present example of the signal timing diagram of FIG. 10) is successively clocked through cascaded flip-flops 401–405 by the high speed clock signal HCLK. Thus, successively delayed versions of the low-to-high transition of signal QA on line 141 will be coupled as respective inputs to multiplexer 420. The time of occurrence of the delayed version of the low-to-high transition of signal QA, corresponding to output signal QC, is defined by the select inputs 424 and 425 of multiplexer 420.

Figure 12:
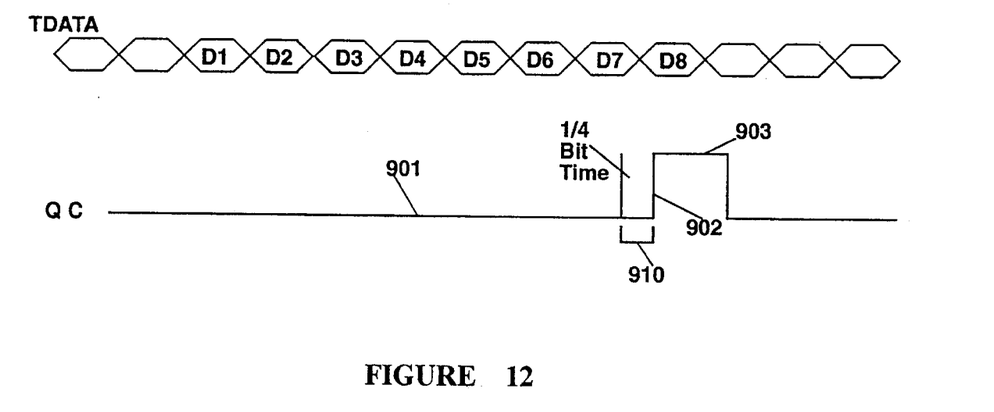
FIG. 12 is timing diagram associated with the operation of the logic circuit of FIG. 11.

As a non-limiting example, and as indicated in the timing diagram of FIG. 12, let it be assumed that it is desired that signal QC is to transition from a low logic level 901 to a high logic level 903 during the last quarter of the bit time D8 of the last data bit. Assuming that the last data bit D8 is sampled by TDCLK mid-bit, as shown by edge 305 in the timing diagram of FIG. 10, then the positive-going edge 902 of signal QC should be delayed on the order of one-quarter of a bit time relative to the negative-going sampling edge of TDCLK, as shown at 910. Letting the frequency of HCLK =16 MHz, and setting MSB select input 425 at a logical '1' and LSB select input 424 at a logical '0' then multiplexer 420 will select the Q output of flip-flop 404, so that the output signal QC will be delayed with respect to input signal QA by approximately one-quarter bit time, as shown at 910.

The exact time of occurrence of the low-to-high edge 902 of signal QC falls within some tolerance window (e.g. on the order of 78.95–88.6% from the beginning of the last bit time D8), since a 16 MHz high speed clock is not an integral multiple of the 1.544 MHz T1 data rate clock, and since the TDCLK and HCLK clock signals are not, in general, frequency-locked. As shown in the bleedover prevention circuit-modified channel unit diagram of FIG. 8, the QC signal on line 87 (from multiplexer 420 of FIG. 11), is then logically ORed in OR gate 88 with whatever data value is output from shift buffer 83, and the resultant signal is supplied over the TDATA lead 45 to transmit unit 35.

As pointed out above, and as shown in the timing diagrams of FIGS. 10 and 12, because each data bit Di is sampled mid-bit, driving the TDATA lead 45 high during the last quarter of the D8 bit time will not corrupt the sampled value of the data, as sampled by clock edge 305, but will prevent a '0' from 'bleeding' over into the first or first and second bits of an immediately subsequent vacant or unoccupied channel unit time slot.

As will be appreciated from the foregoing description, the potential for a low data value of the last bit of an occupied channel time slot to bleed over or extend into the first and possibly second bit times of an immediately following unoccupied time slot, due to low value of the data line's pull-up resistor, is effectively obviated in accordance with the present invention, by forcing the state of the TDATA lead to a high logic level within a terminal portion of the last bit time of a respective occupied channel unit time slot, irrespective of the data value of that bit time. The terminal portion of the last bit time occurs within a time interval that is sufficiently delayed relative to the time of occurrence of the clock edge of the TDCLK clock through which the last bit's data value is sampled, so that it does not detrimentally impact the validity of the value of the last data bit. If the immediately succeeding channel time slot is unoccupied, driving the TDATA lead high prior to the beginning of such unoccupied channel time slot will render immaterial whether the last data bit value of the occupied channel time slot is a 'one' or a 'zero', and will serve to effectively overcome the relatively long charging time, that would otherwise be required to pull the data lead high if the last data bit value were a 'zero'.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. For use with digital data communication system having a digital data transmission link over which a digital communications signal transmitter transmits digital data communication signals during successive time division multiplexed transmission time slots, respective ones of said transmission time slots being associated with respective channel units that are coupled to a data input link, signal values of said digital data signals being representative of the voltage level of said data input link sampled by said digital communications signal transmitter at successive prescribed transitions of a sampling clock signal, said data input link being referenced to a prescribed voltage level through an electrical circuit element, said electrical circuit element being operative to pull said data input link to said prescribed voltage level, during a transmission time slot for which there is no associated installed channel unit coupled to said data input link and asserting a digital data representative voltage level on said data input link, a method of bringing said data input link to said prescribed voltage level comprising the steps of:

(a) monitoring the occurrence of the last of said prescribed transitions of said sampling clock signal during a respective transmission time slot associated with a respective associated installed channel unit; and (b) driving said data input link to said prescribed voltage level subsequent to said occurrence of the last of said prescribed transitions of said sampling clock signal during said respective transmission time slot associated with said respective installed channel unit, but prior to the occurrence of the first of said prescribed transitions of said sampling clock signal during an immediately successive transmission time slot for which there is no associated installed channel unit coupled to said data input link.

2. A method according to claim 1, where step (a) further includes defining a terminal portion of the last bit time of said respective transmission time slot associated with said respective installed channel unit, and wherein step (b) comprises driving said data input link to said prescribed voltage within said terminal portion of the last bit time of said respective transmission time slot associated with said respective installed channel unit, irrespective of the voltage level of said data input link when sampled during said last bit time.

3. A method according to claim 2, wherein said terminal portion of the last bit time is within a prescribed time interval subsequent to the time of the occurrence of said last of said prescribed transitions of said sampling clock signal, during said respective transmission time slot associated with said respective installed channel unit.

4. A method according to claim 3, wherein a respective one of said prescribed transitions of said sampling clock signal occurs in a middle portion of a bit time.

5. A method according to claim 4, wherein said prescribed time interval corresponds to the last one-quarter of said last bit time.

6. A method according to claim 4, wherein said respective one of said prescribed transitions of said sampling clock signal corresponds to a falling edge of said data sampling clock signal which occurs essentially at the midpoint of a data bit time.

7. A method according to claim 1, wherein step (a) comprises logically combining said sampling clock signal and sequence control signals which control said respective installed channel unit asserting data onto said data input link during said respective transmission time slot associated therewith, to provide a logic level transition signal at the midpoint of the last bit time of said respective transmission time slot, coincident with the last one of said successive prescribed transitions of said sampling clock signal during said respective transmission time slot.

8. A method according to claim 7, wherein step (a) further comprises controllably delaying said logic level transition signal by a delay amount that corresponds to a selected sub-portion of said last bit time.

9. For use with digital data communication system having a digital data link over which a digital channel unit transmits a sequence of digital data signals during an occupied channel unit time slot associated with said digital channel unit, said digital data link being referenced to a prescribed voltage through an electrical circuit element, said electrical circuit element being operative to pull said digital data link to said prescribed voltage during an unoccupied channel unit time slot, for which there is no channel unit coupled to transmit digital data on said digital data link, a method of bringing said digital data link to a prescribed logic level for use by said system during said unoccupied channel unit time, comprising the steps of:

(a) defining a terminal portion of the last bit time of said occupied channel unit time slot; and (b) forcing said digital data link to said prescribed voltage within said terminal portion of the last bit time of said occupied channel unit time slot, irrespective of the data value of said last bit time.

10. A method according to claim 9, wherein said terminal portion of the last bit time occurs within a prescribed time interval, subsequent to the time of occurrence of a data sampling clock signal edge that samples said last bit time's data value for assertion onto said digital data link.

11. A method according to claim 10, wherein said data sampling clock signal edge occurs at a middle portion of a bit time, and wherein said prescribed time interval corresponds to the last one-quarter of said bit time.

12. A method according to claim 10, wherein said data sampling clock signal edge corresponds to a falling edge of said data sampling clock signal which occurs essentially at the midpoint of a data bit.

13. A method according to claim 12, wherein step (a) comprises logically combining said data sampling clock signal and sequence control signals which control said digital channel unit transmitting digital data signals during said occupied channel unit time slot associated to provide a logic level transition signal at the midpoint of said last bit of said occupied channel unit time slot coincident with said falling edge of said data sampling clock signal.

14. A method according to claim 13, wherein step (a) further comprises controllably delaying said logic level transition signal by a delay amount that corresponds to a selected sub-portion of said bit time.

15. For use with digital data communication system having a time division multiplexed digital data communications bus over which respective ones of a plurality of digital channel units installed on said time division multiplexed digital data communications bus transmit respective frames of digital data during respective ones of a plurality of preassigned channel unit time slots, said time division multiplexed digital data communications bus being coupled to a prescribed voltage through an electrical circuit element, which is operative to pull said time division multiplexed digital data communications bus to said prescribed voltage during an unoccupied channel unit time slot for which there is no associated digital channel unit installed on said time division multiplexed digital data communications bus to transmit a respective frame of digital data over said time division multiplexed digital data communications bus, a method of preventing the occurrence of a zero data bit in the last bit position of a frame of data from bleeding over into one or more bit times of said unoccupied channel unit time slot comprising the steps of:

(a) defining a terminal portion of the last bit time of a respective one of said plurality of preassigned channel unit time slots immediately prior to said unoccupied channel time slot; and (b) forcing said time division multiplexed digital data communications bus to said prescribed voltage within said terminal portion of the last bit time of said respective one of said plurality of preassigned channel unit time slots immediately prior to said unoccupied channel time slot, irrespective of the data value of said last bit time.

16. A method according to claim 15, wherein said terminal portion of the last bit time is within a prescribed time interval subsequent to the time of occurrence of a data sampling clock signal edge through which said last bit time's data value is sampled for assertion onto said time division multiplexed digital data communications bus.

17. A method according to claim 16, wherein said data sampling clock signal edge occurs at a middle portion of a bit time, and wherein said prescribed time interval corresponds to the last one-quarter of said bit time.

18. A method according to claim 16, wherein said data sampling clock signal edge corresponds to a falling edge of said data sampling clock signal which occurs essentially at the midpoint of a data bit.

19. For use with digital data communication system having a digital data link over which a digital channel unit transmits a sequence of digital data signals during an occupied channel unit time slot associated with said digital channel unit, said digital data link being referenced to a prescribed voltage through an electrical circuit element, said electrical circuit element being operative to pull said digital data link to said prescribed voltage during an unoccupied channel unit time slot, for which there is no channel unit coupled to transmit digital data on said digital data link, a bleedover prevention circuit which is operative to bring said digital data link to a prescribed logic level for use by said system during said unoccupied channel unit time slot, comprising:

a digital signal processing circuit which is operative to logically combine a data sampling clock signal and sequence control signals which control said digital channel unit transmitting digital data signals during said occupied channel unit time slot and provides an output signal representative of a terminal portion of the last bit time of said occupied channel unit time slot; and a digital data link control circuit which is operative to bring said digital data link to said prescribed voltage within said terminal portion of the last bit time of said occupied channel unit time slot, irrespective of the data value of said last bit time.

20. A bleedover prevention circuit according to claim 19, wherein said terminal portion of the last bit time is within a prescribed time interval subsequent to the time of occurrence of a data sampling clock signal edge through which said last bit time's data value is sampled for assertion onto said digital data link.

21. A bleedover prevention circuit according to claim 20, wherein said data sampling clock signal edge occurs at the middle portion of a bit time, and wherein said prescribed time interval corresponds to the last one-quarter of said bit time.

22. A bleedover prevention circuit according to claim 20, wherein said data sampling clock signal edge corresponds to a falling edge of said data sampling clock signal which occurs essentially at the midpoint of a data bit.

23. A bleedover prevention according to claim 22, wherein said digital signal processing circuit is operative to logically combine said data sampling clock signal and said sequence control signals to provide a logic level transition signal at the midpoint of said last bit of said occupied channel unit time slot coincident with said falling edge of said data sampling clock signal.

24. A bleedover prevention according to claim 23, wherein said digital signal processing circuit includes a delay circuit which is operative to controllably delay said logic level transition signal by a delay amount that corresponds to a selected sub-portion of said bit time.

* * * * *